United States Patent
Lee et al.

(10) Patent No.: US 10,151,904 B2
(45) Date of Patent: Dec. 11, 2018

(54) OPTICAL IMAGING DEVICE

(71) Applicant: Young Optics Inc., Hsinchu Science Park (TW)

(72) Inventors: Chen-Cheng Lee, Hsinchu Science Park (TW); Hsin-Te Chen, Hsinchu Science Park (TW); Kuo-Chuan Wang, Hsinchu Science Park (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 85 days.

(21) Appl. No.: 15/149,865

(22) Filed: May 9, 2016

(65) Prior Publication Data
US 2017/0322397 A1    Nov. 9, 2017

(51) Int. Cl.
| | |
|---|---|
| *G02B 13/18* | (2006.01) |
| *G02B 13/06* | (2006.01) |
| *G02B 9/64* | (2006.01) |
| *G02B 27/00* | (2006.01) |
| *G02B 9/62* | (2006.01) |

(52) U.S. Cl.
CPC ............... *G02B 13/06* (2013.01); *G02B 9/64* (2013.01); *G02B 13/18* (2013.01); *G02B 9/62* (2013.01); *G02B 27/0025* (2013.01)

(58) Field of Classification Search
CPC . G02B 13/06; G02B 9/62; G02B 9/64; G02B 13/18; G02B 27/0025

USPC .................................................. 359/725, 708
See application file for complete search history.

(56) References Cited

U.S. PATENT DOCUMENTS

| | | | |
|---|---|---|---|
| 7,046,458 B2 | 5/2006 | Nakayama | |
| 7,612,946 B2 * | 11/2009 | Kweon, II | ............. G02B 13/06 359/725 |
| 2008/0174887 A1 | 7/2008 | Asami | |
| 2012/0113532 A1 | 5/2012 | Lee | |

FOREIGN PATENT DOCUMENTS

TW    I418873    12/2013

* cited by examiner

*Primary Examiner* — Evelyn A Lester
(74) *Attorney, Agent, or Firm* — Muncy, Geissler, Olds & Lowe, P.C.

(57) ABSTRACT

One embodiment of the invention discloses an optical imaging device including an optical lens. The optical lens has N number of lenses, and the N number of lenses are divided into a first lens group and a second lens group and have at least three aspheric lenses. The first lens group is disposed between an object side and an image side, and the first lens group has (N/2)−1 piece of lens. The first lens group includes, in order from the object side, a first lens, a second lens and a third lens, and the second lens is an aspheric lens. The second lens group is disposed between the first lens group and the image side, and an aperture stop is disposed between the first lens group and the second lens group.

20 Claims, 9 Drawing Sheets

OPTICAL IMAGING DEVICE

BACKGROUND OF THE INVENTION a. Field of the Invention

The invention relates generally to an optical imaging device, and more particularly to a panoramic optical imaging device.

b. Description of the Related Art

Figure 11:
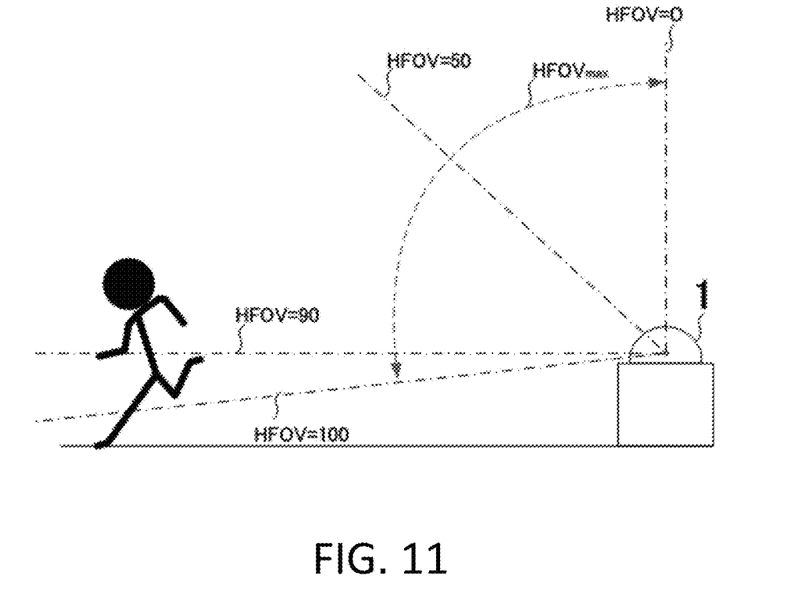
FIG. 11 shows a schematic diagram illustrating a half field of view according an aspect of the invention.

Recent advances in technology have led to the development of various types of optical lenses. A wide angle lens, such as described in Taiwan patent no. I418873, is a commonly used optical imaging device. An optical lens having a half field of view (HFOV) greater than 90 degrees is typically called a fisheye lens or a panoramic lens. FIG. 11 shows a schematic diagram illustrating a wide angle lens and its half field of view. As illustrated in FIG. 11, when an optical imaging device 1, functioning as a surveillance camera, is disposed at a lower position, such as on the floor, a middle part of the HFOV thereof, namely from a viewing angle of 0 degree to 40 or 50 degrees, is often not a key field for surveillance, and such scope of the view filed usually captures unimportant sky or tree scenes in the outdoors. Under the circumstance, a key field for surveillance may be obtained by having an angle of view exceeding a specific value to capture important scenes. However, as the viewing angle increases, optical distortions may rapidly increase and image edges are liable to be compressed to deteriorate image qualities of an optical lens.

BRIEF SUMMARY OF THE INVENTION

According to one aspect of the present disclosure, an optical imaging device includes an optical lens having N number of lenses, the N number of lenses are divided into a first lens group and a second lens group and have at least three aspheric lenses in the said optical lens. The first lens group is disposed between an object side and an image side, and the first lens group has (N/2)−1 piece of lens. The first lens group includes, in order from the object side to the image side, a first lens, a second lens and a third lens, and the second lens is an aspheric lens. The second lens group is disposed between the first lens group and the image side, and an aperture stop is disposed between the first lens group and the second lens group. A maximum field of view of the optical lens is greater than or equal to 180 degrees.

According to another aspect of the present disclosure, an optical imaging device includes an optical lens having at least one aspheric lens, and the aspheric lens has a maximum thickness ratio (hereinafter briefly referred to as "thickness ratio") smaller than 4.5 measured in a direction parallel to an optical axis. The optical lens has a maximum field of view greater than or equal to 180 degrees, and the optical lens receives an image from an object side and output a panoramic image to an image side. Furthermore, the panoramic image has a first length and a second length, and a ratio of the first length to the second length is in the range of, for example, 30%-50%. The first length is, for example, defined as a length of a diagonal line in the 0-100 FOV degrees sector of the panoramic image. The second length is, for example, defined as the length of a diagonal line of the maximum FOV sector of the panoramic image.

According to another aspect of the present disclosure, an optical imaging device includes an optical lens having a maximum field of view greater than or equal to 180 degrees and forming a panoramic image to an image side. The panoramic image is represented as a distribution line in a coordinate plot, an abscissa of the coordinate plot represents a half field of view, an ordinate of the coordinate plot represents a distance ratio, the distance ration is defined as the ratio of a first distance to a second distance, where the first distance is a distance between a point and a center of the panoramic image, the second distance is a distance between an outermost point of the panoramic image and the center of the panoramic image, the abscissa is divided, from zero to a maximum field of view, former to latter, into ten equal parts to correspondingly divide the coordinate plot into ten sectors, slopes of the distribution line of at least four sectors of the latter five sectors of the coordinate plot are respectively greater than a standard slope, and the standard slope is a slope of a straight line connected between coordinates (0, 0) and coordinates (1, 1) of the coordinate plot.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "front," "back," etc., is used with reference to the orientation of the Figure(s) being described instead of limiting the scope of the present invention.

The invention relates to an optical imaging device including a panoramic imaging lens (hereinafter referred to as an "optical lens") with a FOV equal to or greater than 180 degrees. The optical lens 10 may be disposed between a subject to be picked-up and an optical sensor. The subject and the optical sensor are disposed in opposite sides that are respectively defined as an object side (or called magnified side) OS and an image side (or called minified side) IS. The optical lens 10 may be designed to include a first lens group 11, a second lens group 12, an aperture stop S, and an optional cover glass CG. The first lens group 11 and the second lens group 12 are arranged along an optical axis A of the optical lens 10, and an aperture stop S is disposed between the first lens group 11 and the second lens group 12. The first lens group 11 is located between the aperture stop S and the object side OS. The second lens group 12 is located between the aperture stop S and the image side IS. The cover glass CG may be disposed between the second lens group 12 and the image side IS. Further, in one embodiment, assume N denotes a number of lenses of the optical lens 10 and M denotes a number of lenses of the first lens group 11, the condition: M≥(N/2)−1 is satisfied, where M and N are positive integers. For example, in case N=12, the first lens group 11 may includes at least five lenses.

Figure 1:
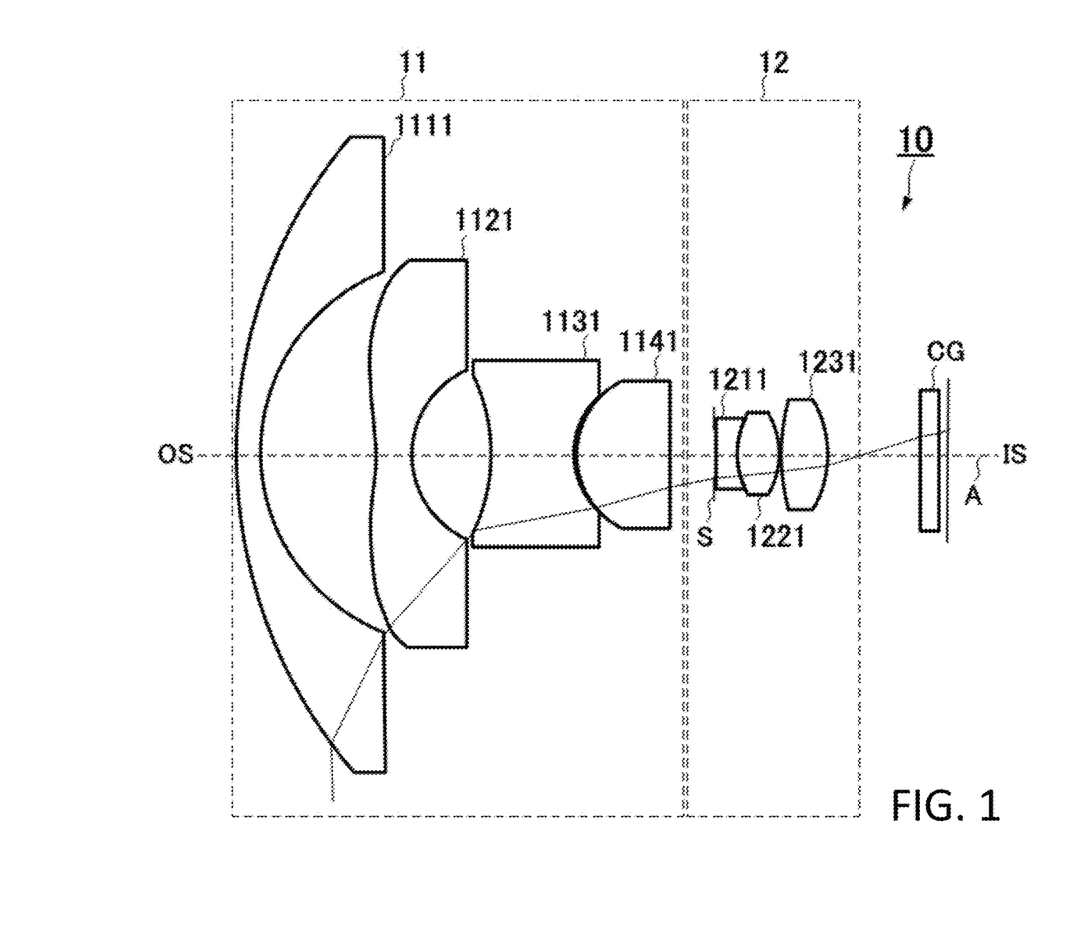
FIG. 1 shows a schematic diagram of an optical lens according to a first embodiment of the invention.

In one embodiment, a thickness ratio of an aspheric lens of the optical lens 10 measured in a direction parallel to the optical axis A may be smaller than 4.5, preferably less than 3. The thickness ratio measured in a direction parallel to the optical axis A is defined as a ratio of a maximum thickness to a minimum thickness measured in a direction parallel to the optical axis A. For example, as shown in FIG. 1, if a lens has an axial thickness of 10 mm at its thickest portion and an axial thickness of 4 mm at its thinnest portion, the thickness ratio is equal to 2.5. Further, in one embodiment, a total track length of the optical lens 10 is equal to or smaller than 26.99 mm.

FIG. 1 shows a schematic diagram of an optical lens according to a first embodiment of the invention. As shown in FIG. 1, in this embodiment, the first lens group 11 includes four lenses and the second lens group 12 includes three lenses. The optical lens 10 includes, in order from the object side OS, a first lens 1111 to seventh lens 1231 having refractive power of negative, negative, negative, positive, negative, positive and positive, respectively. Further, in this embodiment, the condition: f2/f<0 is satisfied, where f2 denotes an effective focal length of the second lens 1121, and f denotes an effective focal length of the optical lens 10.

Besides, in this embodiment, the second lens 1121 is an aspheric lens, and the optical lens 10 satisfies the condition: 0.5<|f2/fL|<5, where f2 denotes an effective focal length of the second lens 1121, and fL denotes an effective focal length of the last lens 1231 with refractive power in the second lens group 12 nearest to the image side IS.

Table 1 and Table 2 below provide optical data of each lens and aspheric coefficients of each aspheric lens in the optical lens 10 shown in FIG. 1.

TABLE 1

| Object description | Surface number | Surface type | Radius (mm) | Interval (mm) | ND | VD |
|---|---|---|---|---|---|---|
| G1 | S1 | spherical | 20.1 | 1 | 1.804 | 46.5 |
|  | S2 | spherical | 7.8 | 4.6 | — | — |
| P2 | S3 | aspheric | −8.9 | 1.5 | 1.53 | 55.7 |
|  | S4 | aspheric | 3.3 | 3.2 | — | — |
| P3 | S5 | aspheric | −13.9 | 3.3 | 1.53 | 55.7 |
|  | S6 | aspheric | 3.4 | 0.1 | — | — |
| P4 | S7 | aspheric | 3.2 | 3.8 | 1.635 | 23.9 |
|  | S8 | aspheric | −13.7 | 1.8 | — | — |
|  | S9 | spherical | ∞ | 0.1 | — | — |
| G5 | S10 | spherical | 62.4 | 0.9 | 1.922 | 20.8 |
| G6 | S11 | spherical | 3.5 | 1.7 | 1.487 | 70.4 |
|  | S12 | spherical | −3.5 | 0.1 | — | — |
| G7 | S13 | spherical | 7.4 | 1.8 | 1.497 | 81.6 |
|  | S14 | spherical | −4.8 | 3.9 | — | — |
| CG | S15 | spherical | ∞ | 0.8 | 1.516 | 64.1 |
|  | S16 | spherical | ∞ | 0.3 | — | — |

In table 1, the first letter of each item grouped in the field heading of "object description" indicates material characteristics of the object. Specifically, the first letter "G" indicates a glass material, and the first letter "P" indicates a plastic material. Further, among the field headings, "Interval" represents a linear distance of two adjacent surfaces along the optical axis A. For example, an interval of the surface S1 is a linear distance between the surface S1 and the surface S2. Further, ND denotes an index of refraction, and VD denotes an Abbe number. Moreover, in table 1, the surfaces S1 and S2 are two lens surfaces of the first lens 1111, the surfaces S3 and S4 are two lens surfaces of the second lens 1121, and the remaining lens surfaces are deduced by analogy and be omitted for concision.

According to the above embodiment, the surfaces S3, S4, S5, S6, S7 and S8 are aspheric surfaces that satisfy the following equation:

$$Z = \frac{X^2}{R + \sqrt{R^2 - (1+k)X^2}} + A_4 X^4 + A_6 X^6 + A_8 X^8 + \ldots,$$

where X denotes an aspheric height, Z denotes a sag of an aspheric surface along the optical axis A, R denotes a radius of curvature at the vertex, K denotes a Conic constant, and $A_4, A_6, A_8, A_{10} \ldots$ are aspheric coefficients. The values of aspheric coefficients of each aspheric lens are listed in Table 2. Table 2

|  | R | K | 4th | 6th | 8th | 10th |
|---|---|---|---|---|---|---|
| P2R1 | −8.86881 | −43.9092 | 0.001235 | −1.98E−05 | 1.30E−07 | 4.04E−10 |
| P2R2 | 3.320188 | −0.46973 | 0.000301 | −0.00032 | 6.76E−05 | −3.36E−06 |
| P3R1 | −13.9231 | 13.38385 | −0.00735 | 0.00098 | −7.57E−05 | 2.86E−06 |
| P3R2 | 3.373347 | −0.48154 | 0.020112 | −0.00495 | 0.000466 | −1.50E−05 |
| P4R1 | 3.173317 | −1.23308 | 0.021523 | −0.00428 | 0.000463 | −1.64E−05 |
| P4R2 | −13.6781 | −2.93192 | 0.007241 | 0.000374 | 1.86E−05 | 5.51E−05 |

The following embodiments use similar reference numerals and contain part content of the above embodiment, where similar reference numerals refer to identical or functionally similar elements throughout the embodiments and the same technical descriptions are omitted. The content omitted may refer to the embodiment previously described and thus not described repeatedly in detail in the following embodiments.

Figure 2:
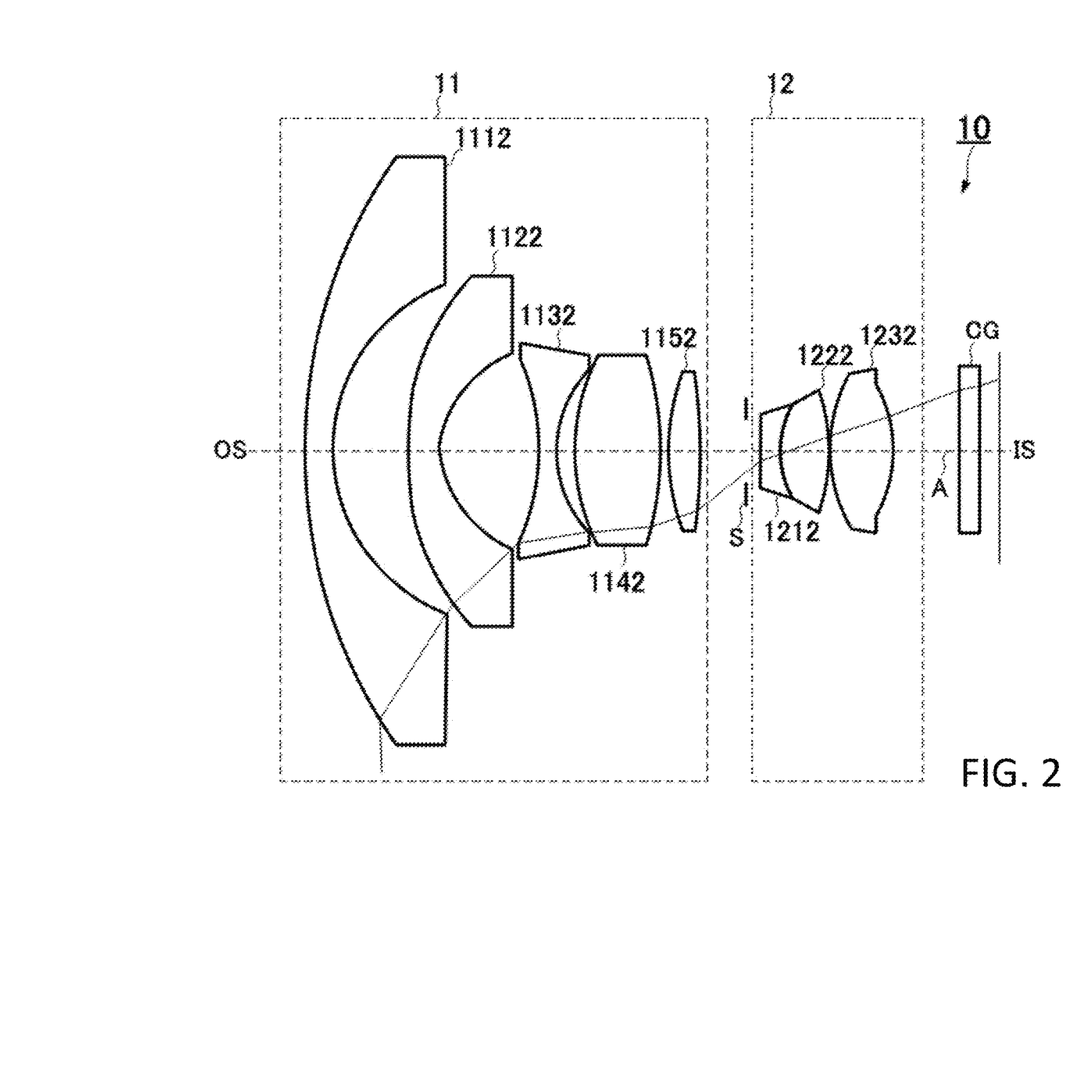
FIG. 2 shows a schematic diagram of an optical lens according to a second embodiment of the invention.

FIG. 2 shows a schematic diagram of the optical lens 10 according to a second embodiment of the invention. A main difference of the second embodiment as compared with the first embodiment is that the first lens group 11 has five lenses. All lenses of the optical lens 10 shown in FIG. 2 have refractive power of negative, negative, negative, positive, positive, negative, positive and positive, respectively. Table 3 and Table 4 below provide optical data of each lens and aspheric coefficients of each aspheric lens in the optical lens 10 shown in FIG. 2.

TABLE 3

| Object description | Surface number | Surface type | Radius (mm) | Interval (mm) | ND | VD |
|---|---|---|---|---|---|---|
| G1 | S1 | spherical | 19.6 | 1 | 1.883 | 40.7 |
|  | S2 | spherical | 6.6 | 2.9 | — | — |
| P2 | S3 | aspheric | −59.7 | 1.1 | 1.53 | 55.7 |
|  | S4 | aspheric | 4.2 | 3.6 | — | — |
| P3 | S5 | aspheric | −11.7 | 0.7 | 1.53 | 55.7 |
|  | S6 | aspheric | 3.7 | 0.7 | — | — |
| G4 | S7 | spherical | 7.9 | 3.1 | 1.762 | 26.5 |
|  | S8 | spherical | −12.5 | 0.3 | — | — |
| G5 | S9 | spherical | 8.7 | 1.2 | 1.699 | 30.1 |
|  | S10 | spherical | −23 | 1.7 | — | — |
|  | S11 | spherical | ∞ | 0.5 | — | — |
| G6 | S12 | spherical | −13.6 | 0.7 | 1.923 | 20.9 |
| G7 | S13 | spherical | 3.2 | 1.8 | 1.743 | 49.3 |
|  | S14 | spherical | −8.5 | 0.1 | — | — |
| P8 | S15 | aspheric | 5.7 | 2.3 | 1.53 | 55.7 |
|  | S16 | aspheric | −4.7 | 2.5 | — | — |
| CG | S17 | spherical | ∞ | 0.8 | 1.516 | 64.1 |
|  | S18 | spherical | ∞ | 0.7 | — | — |

TABLE 4

|  | R | K | 4th | 6th | 8th | 10th | 12th | 14th |
|---|---|---|---|---|---|---|---|---|
| P2R1 | −59.7215 | 0 | 0.006006 | −0.00028 | 6.82E−06 | −9.32E−08 | 6.70E−10 |  |
| P2R2 | 4.182236 | 0 | 0.005932 | 0.000486 | −7.63E−05 | 1.67E−06 | 0 |  |
| P3R1 | −11.717 | 0 | −0.00037 | −0.00015 | 5.55E−06 | 5.10E−08 | 0 |  |
| P3R2 | 3.724369 | 0 | −0.00175 | −0.00036 | 3.04E−05 | −1.89E−06 | 0 |  |
| P8R1 | 5.675526 | 0 | −0.00245 | 0.000342 | −3.86E−05 | 2.99E−06 | 0 |  |
| P8R2 | −4.72348 | 0 | 0.002497 | −2.31E−05 | −1.50E−05 | 1.08E−05 | −1.56E−06 | 8.53E−08 |

Figure 3:
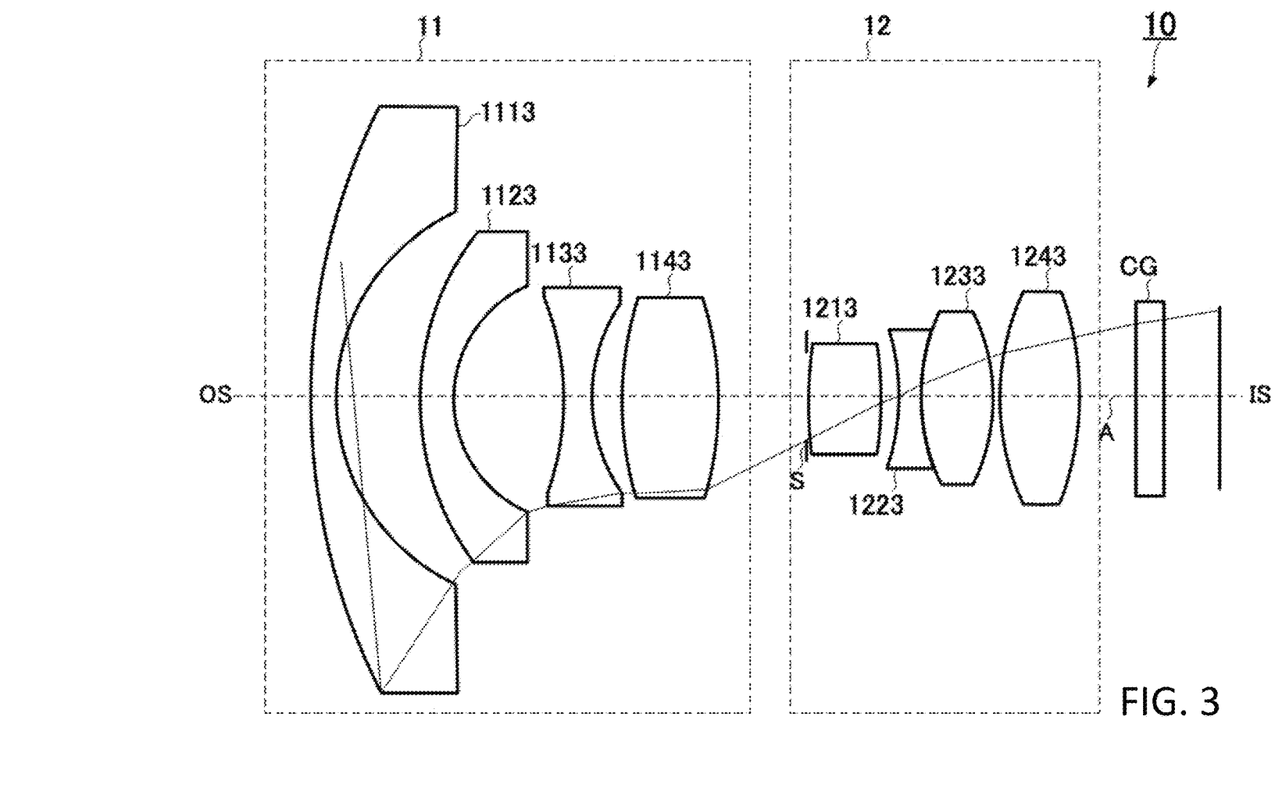
FIG. 3 shows a schematic diagram of an optical lens according to a third embodiment of the invention.

FIG. 3 shows a schematic diagram of the optical lens 10 according to a third embodiment of the invention. A main difference of the third embodiment as compared with the first embodiment is that the second lens group 12 has four lenses. All lenses of the optical lens 10 shown in FIG. 3 have refractive power of negative, negative, negative, positive, positive, negative, positive and positive, respectively. In this embodiment, a removable IR cut filter is included. In case a thickness of the cover glass CG is 0.5 mm and a thickness of the IR cut filter is 0.3 mm, a total track length of the optical lens 10 is 26.99 mm, a back focal length (BFL) is 4.27 mm, and an effective focal length (EFL) is 1.505 mm. In this embodiment, the total track length may include the length of the cover glass and the IR cut filter. In practical use, however, the total track length may be referred to as a maximum linear distance along an optical axis between a lens of non-zero refractive power nearest to the object side in the first lens group 11 and a lens of non-zero refractive power nearest to the image side in the second lens group 12. In one embodiment, the total track length is smaller than 32 mm, and preferably smaller than 28 mm.

Table 5 and Table 6 below provide optical data of each lens and aspheric coefficients of each aspheric lens in the optical lens 10 shown in FIG. 3.

TABLE 5

| Object description | Surface number | Surface type | Radius (mm) | Interval (mm) | ND | VD |
|---|---|---|---|---|---|---|
| G1 | S1 | spherical | 19.31 | 0.65 | 1.883 | 40.7 |
|  | S2 | spherical | 5.85 | 2.74 | — | — |
| P2 | S3 | aspheric | 77.14 | 0.82 | 1.64 | 23.9 |
|  | S4 | aspheric | 4.59 | 3.31 | — | — |
| P3 | S5 | aspheric | −5.18 | 0.81 | 1.53 | 55.7 |
|  | S6 | aspheric | 8.09 | 0.83 | — | — |
| G4 | S7 | spherical | 8.93 | 2.87 | 1.923 | 20.9 |
|  | S8 | spherical | −10.72 | 2.56 | — | — |
| G5 | S9 | spherical | ∞ | 0.1 | — | — |
|  | S10 | spherical | 6.87 | 2.24 | 1.487 | 70.4 |
|  | S11 | spherical | −6.87 | 0.46 | — | — |
| G6 | S12 | spherical | −5.85 | 0.65 | 1.923 | 20.9 |
| G7 | S13 | spherical | 5.85 | 2.14 | 1.6785 | 55.34 |
|  | S14 | spherical | −5.85 | 0.1 | — | — |
| P8 | S15 | aspheric | 5.51 | 2.45 | 1.53 | 55.7 |
|  | S16 | aspheric | −8.62 | 1.73 | — | — |

TABLE 5-continued

| Object description | Surface number | Surface type | Radius (mm) | Interval (mm) | ND | VD |
|---|---|---|---|---|---|---|
| CG | S17 | spherical | ∞ | 0.8 | 1.516 | 64.1 |
|  | S18 | spherical | ∞ | 1.707 | — | — |

TABLE 6

|  | R | K | 4th | 6th | 8th | 10th | 12th | 14th |
|---|---|---|---|---|---|---|---|---|
| P2R1 | 77.14063 | 0 | 0.00505 | −0.00019 | 4.24E−06 | −7.63E−08 | 7.56E−10 | 0 |
| P2R2 | 4.588471 | 0 | 0.004746 | 0.000216 | −1.07E−06 | −1.21E−06 | 0 | 0 |
| P3R1 | −5.17629 | −8.12377 | 0.004597 | −0.00079 | 5.00E−05 | −1.24E−06 | 0 | 0 |
| P3R2 | 8.087694 | 0 | 0.012342 | −0.00172 | 0.000131 | −4.02E−06 | 0 | 0 |
| P8R1 | 5.511203 | 0 | −0.00136 | −5.90E−05 | 7.84E−06 | −5.16E−07 | 0 | 0 |
| P8R2 | −8.62082 | 0 | 0.000985 | −0.00013 | 1.53E−05 | −6.85E−07 | −2.23E−08 | 1.34E−09 |

Figure 4:
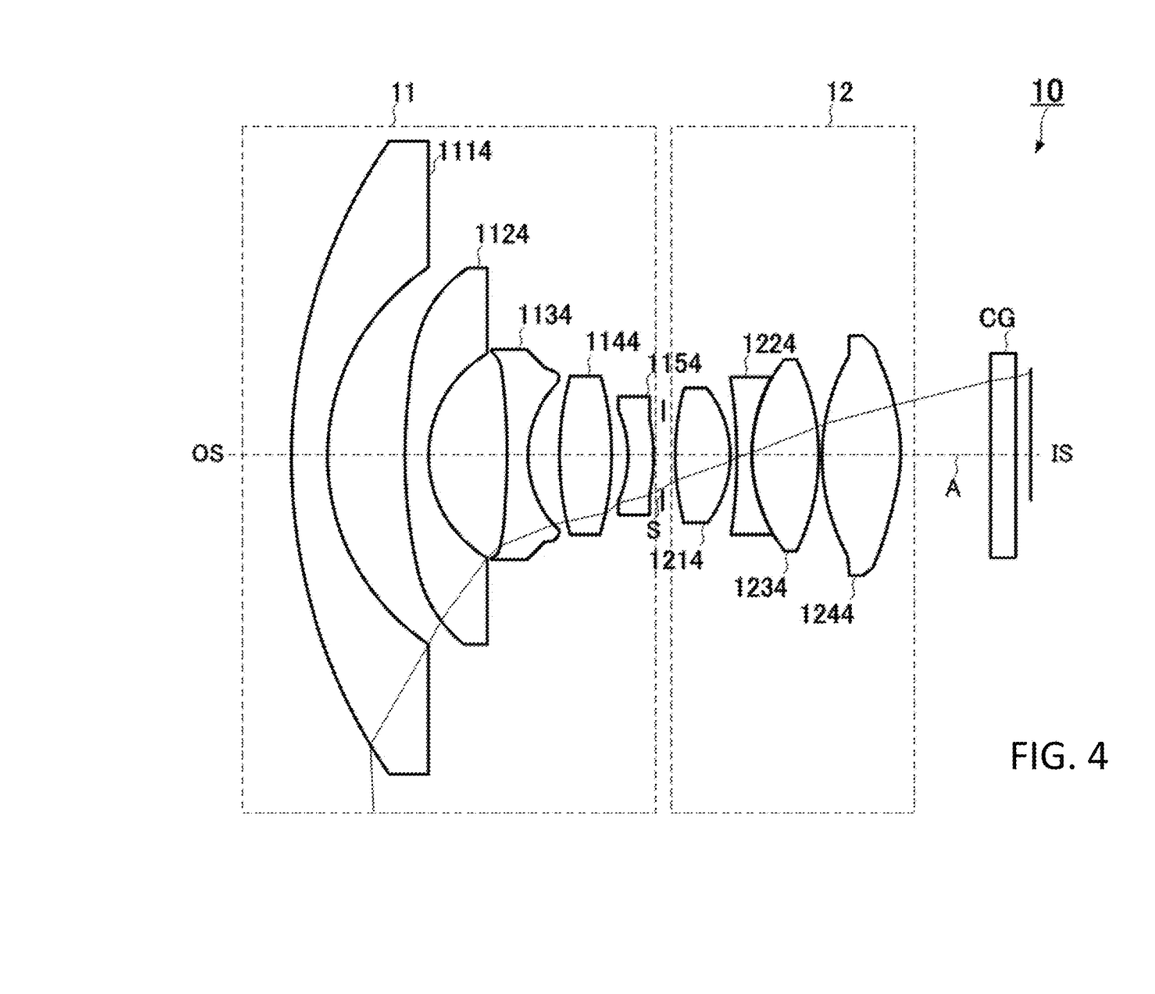
FIG. 4 shows a schematic diagram of an optical lens according to a fourth embodiment of the invention.

FIG. 4 shows a schematic diagram of the optical lens 10 according to a fourth embodiment of the invention. A main difference of the fourth embodiment as compared with the first embodiment is that the second lens group 12 has four lenses. All lenses of the optical lens 10 shown in FIG. 4 have refractive power of negative, negative, negative, positive, negative, positive, negative, positive and positive, respectively. Table 7 and Table 8 below provide optical data of each lens and aspheric coefficients of each aspheric lens in the optical lens 10 shown in FIG. 4.

TABLE 7

| Object description | Surface number | Surface type | Radius (mm) | Interval (mm) | ND | VD |
|---|---|---|---|---|---|---|
| G1 | S1 | spherical | 18.94 | 1.2 | 1.834 | 42.713 |
|    | S2 | spherical | 7.4045 | 2.5524 | — | — |
| P2 | S3 | aspheric | 44.65 | 0.7318 | 1.546 | 56.08 |
|    | S4 | aspheric | 4.3055 | 2.5588 | — | — |
| P3 | S5 | aspheric | −40.77 | 0.7409 | 1.546 | 56.08 |
|    | S6 | aspheric | 2.8786 | 1.081 | — | — |
| G4 | S7 | spherical | 9.7811 | 1.8376 | 1.946 | 17.984 |
|    | S8 | spherical | −9.781 | 0.5841 | — | — |
| P5 | S9 | aspheric | −2.588 | 0.7886 | 1.546 | 56.08 |
|    | S10 | aspheric | −4.135 | 0.2565 | — | — |
|    | S11 | spherical | ∞ | 0.4145 | — | — |
| G6 | S12 | spherical | 8.1726 | 1.7115 | 1.497 | 81.608 |
|    | S13 | spherical | −4.007 | 0.216 | — | — |
| G7 | S14 | spherical | −14.63 | 0.5003 | 1.923 | 20.884 |
| G8 | S16 | spherical | 5.3239 | 2.0311 | 1.497 | 81.608 |
|    | S17 | spherical | −7.559 | 0.2 | — | — |
| P9 | S18 | aspheric | 6.7437 | 2.4017 | 1.546 | 56.08 |
|    | S19 | aspheric | −5.298 | 2.993 | — | — |
| CG | S20 | spherical | ∞ | 0.8 | 1.517 | 64.167 |
|    | S21 | spherical | ∞ | 0.5 | — | — |

TABLE 8

|      | R | K | 4th | 6th | 8th | 10th | 12th | 14th |
|---|---|---|---|---|---|---|---|---|
| P2R1 | 44.65025 | 0 | 0.00065 | 5.73E−05 | −5.3E−06 | 2.53E−07 | −6.3E−09 | 6.48E−11 |
| P2R2 | 4.305539 | 0 | 0.001313 | 0.000315 | −6.8E−05 | 5.46E−06 | −1.6E−07 | 2.16E−09 |
| P3R1 | −40.7704 | 0 | 0.011376 | −0.0064 | 0.001466 | −0.00018 | 1.2E−05 | −3.3E−07 |
| P3R2 | 2.878619 | 0 | 0.008494 | −0.00911 | 0.002485 | −0.00033 | 2.18E−05 | −1.2E−06 |
| P5R1 | −2.58759 | 0 | 0.024729 | 0.001947 | −0.0013 | 0.000505 | −0.00012 | 0 |
| P5R2 | −4.13493 | 0 | 0.019552 | 0.00119 | 0.00083 | −0.00072 | 0 | 0 |
| P9R1 | 6.743735 | 0 | −0.00047 | 0.000285 | −2.6E−05 | 9.51E−07 | −2.2E−08 | −4.5E−10 |
| P9R2 | −5.29752 | 0 | 0.003448 | −9.4E−06 | 4.87E−05 | −7.3E−06 | 3.88E−07 | −8.3E−09 |

Figure 5:
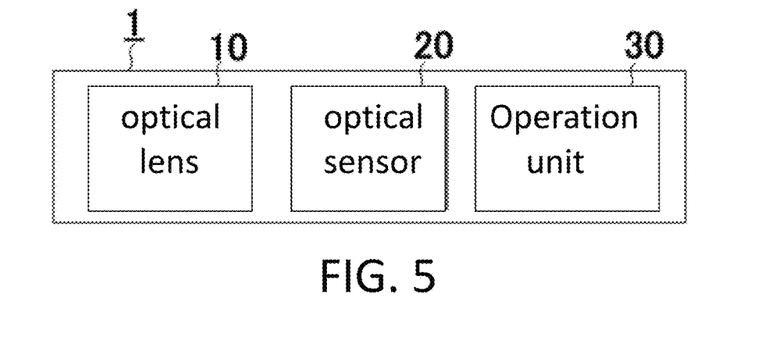
FIG. 5 shows a functional block diagram illustrating an optical imaging device according to an embodiment of the invention.
Figure 6:
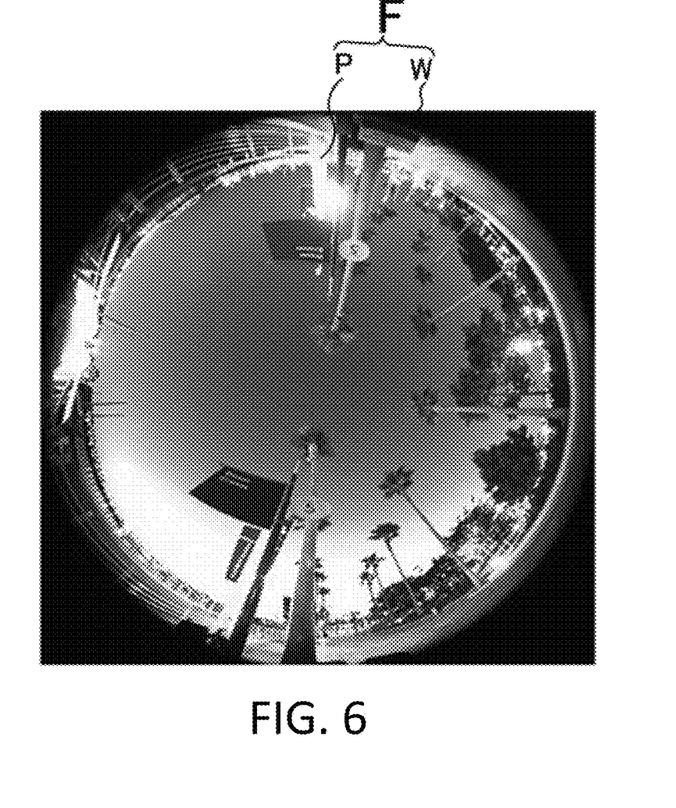
FIG. 6 shows a schematic diagram of a first image according to an embodiment of the invention.

FIG. 5 shows a functional block diagram illustrating an optical imaging device according to an embodiment of the invention. FIG. 6 shows a first image F formed by the optical imaging device and captured by an image-pickup device. As shown in FIG. 5 and FIG. 6, an optical imaging device 1 includes an optical lens 10, an optical sensor 20 and an operation unit 30. The optical lens 10 may be a lens assembly having multiple pieces of lenses. The optical lens 10 receives image beams from the object side (or magnified side) OS, adjusts patterns of the image beams, and then transmits the image beams on the optical sensor 20 on the image side IS. The optical sensor 20 correspondingly generates signals to be processed by the operation unit 30 to generate image data.

The optical lens 10 may be designed according to the above embodiments. The optical sensor 20 may be a CMOS, a CCD, or other device, typically an electronic device, capable of transforming image light into image signals. The operation unit may be a CPU, a single chip, or other electronic device capable of performing image processing operations. Also, though other elements such as a power supply and a memory are not mentioned in the description of the optical imaging device 1, they may be optionally installed in the optical imaging device 1 according to actual demands and thus are not describing in detail here. Besides, the optical imaging device 1 may be housed in a casing and equipped with necessary peripheral devices such as a power supply and a memory to solely serve as a wire or wireless monitor. Alternatively, the optical imaging device 1 may be linked to a computer or other external electronic device to serve as an additional kit.

Operations of the optical imaging device 1 are further described accompanying with the following embodiments. In one aspect of the invention, the optical lens 10 is constructed as an axially symmetric system. The optical lens 10 may adjust patterns of light beams collected outside the optical lens 10 and then transmit the light beams on an optical sensor 20. The optical sensor 20 receives the light to generate a signal correspondingly, and the operation unit 30 processes the signal to generate a first image F correspondingly, with the first image F including a second image P and a third image W exemplified in FIG. 6. Further, the shape and color of the second image P may vary with the type of the optical sensor 20. In this embodiment, the second image P is an RGB color image. Alternatively, the second image P may be a black-and-white image or a grayscale image if desired. The second image P is subject to post-processing and transmitted to an internal or external display to be seen by a viewer.

Figure 7A:
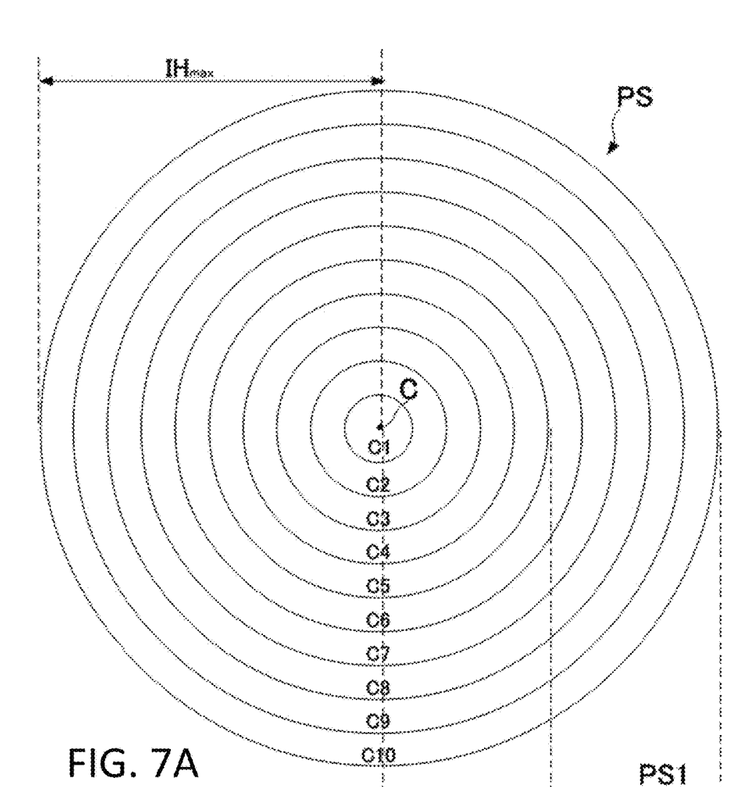
FIG. 7A shows a schematic diagram of a second image according to an embodiment of the invention.
Figure 10:
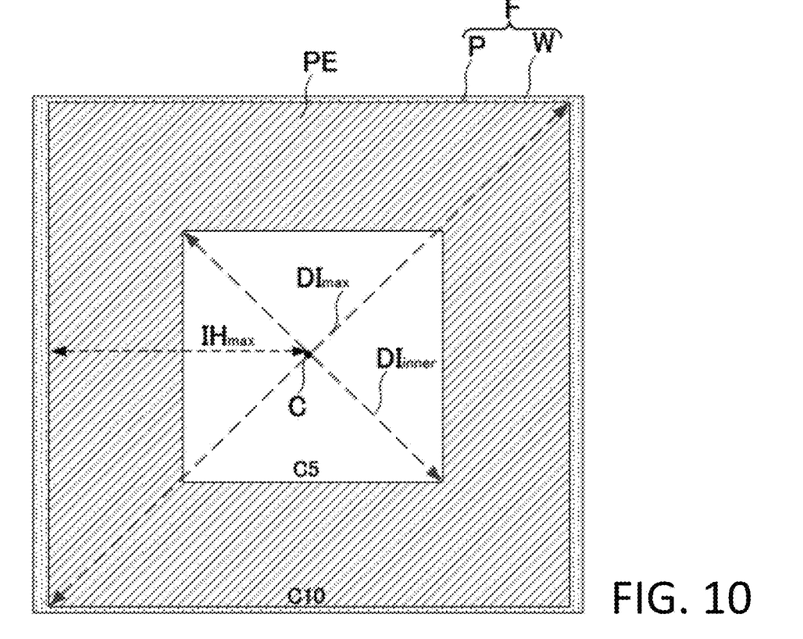
FIG. 10 shows a schematic diagram of a first image according to another embodiment of the invention.

In this embodiment, the second image P is a circular panoramic image at the center of the first image F, and the third image W is a part of the first image F outside the second image P. Therefore, in this embodiment, the third image W is in the shape of a rectangular frame having a hollow circular region therein. The shape of the second image P is not limited; if desired, the second image P may be, for example, rectangular shaped as exemplified in FIG. 10. More specifically, the second image P may be regarded as a region in the first image F formed as a result of receiving panoramic image beams of the optical lens 10; in contrast, the third image W may be regarded as a region in the first image F without receiving the panoramic image beams FIG. 7A shows a schematic diagram of a second image according to an aspect of the invention. As shown in FIG. 7A, the second image P is substantially circular and has a reference center (geometry center) C. The reference center C may optionally coincide with a geometry center of the first image F. A linear distance between any point of the second image P and the reference center C is defined as an image height (or an image distance) IH. Further, a linear distance between an outermost point of the second image P and the reference center C is defined as a maximum image height (or a maximum image distance) IHmax. Besides, multiple sub images Pn having a corresponding shape and are concentric with the second image P are provided in the second image P, where a radius of a sub image Pn is equal to an image height IH of that sub image Pn.

In one embodiment, the shape and graphic distribution of the second image P are closely related to the design of the optical lens 10, where an image of the reference center C of the second image P is corresponding to a light beam incoming from the optical lens 10 at a viewing angle of 0 degree, and an outermost periphery of the second image P is corresponding to a light beam incoming from the optical lens 10 at a maximum viewing angle. Herein, a sub image may be called a standard image PS, if the sub image Pn whose image height IH is equal to a maximum image height $IH_{MAX}$ and graphic distribution ratio is substantially identical to or same as the field of view (FOV) distribution of the optical lens 10.

More specifically, a light incident surface of the optical lens 10 may be divided, from its optical axis to an outermost periphery corresponding to a maximum FOV, into K number (such as 10) of concentric FOV zones, and an image height IH of a sub image Pn equal to a maximum image height IHmax may be divided into K number (such as 10) of segments to correspondingly divide the sub image Pn into K number of concentric image zones C1-C10. In that case, if the concentric FOV zones and the corresponding concentric image zones are arranged, from the center to the periphery of a sub image Pn, in both one order and the reverse order and shows that the graphic distribution of the sub image Pn is substantially identical to the FOV distribution of the optical lens 10, the sub image Pn is qualified as a standard image PS.

Figure 7B:
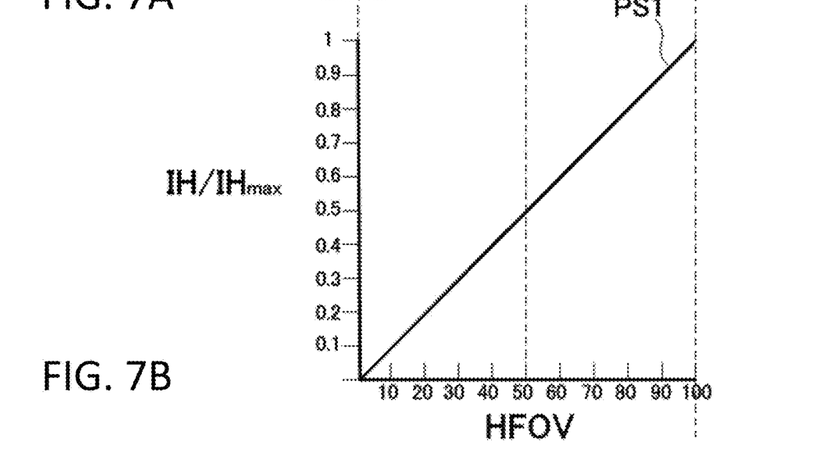
FIG. 7B depicts a distance ratio/HFOV plot according to an embodiment of the invention.

For the purpose of easy comprehension, the standard image PS can be represented as a distribution line in a coordinate plot shown in FIG. 7B. FIG. 7B illustrates a distance ratio/field of view (FOV) coordinate plot. Specifically, an abscissa of the coordinate plot represents a FOV (to be more specific, a half field of view, HFOV) and an ordinate represents the distance ratio which is the ratio of an image height IH of a sub image Pn to the maximum image height IHMAX and is in the range of 0-1. More specifically, the distance ratio can be defined as the ratio of a first distance to a second distance, where the first distance is measured from any point to a center of the panoramic image, and the second distance is measured from an outermost point to the center of the panoramic image. Therefore, each coordinate shown on the plot may be regarded as a value of field of view of the optical lens 10 at a specified image height of a sub image Pn. Moreover, a straight line connected between a point having a distance ratio of 0 and a point having a distance ratio of 1 on the distance ratio/HFOV plot is referred to as a linear distribution function or a standard distribution line PS1, and a slope of the standard distribution line PS1 is called a standard slope. Also, a standard slope may be defined as a slope of a straight line connected between coordinates (0, 0) and coordinates (1, 1) shown in FIG. 7B.

FIGS. 8A, 8B, 8C and 8D show comparison diagrams where a second image P of each of the first to fourth embodiments is compared with a standard image PS, and the second image P and the standard image PS are represented as distribution lines in a distance ratio/HFOV plot. First, the second images P formed by the first to the fourth embodiments of the optical lens 10 are respectively corresponding to a first to a fourth distance ratio/HFOV distribution lines (briefly referred to as distribution lines) G1-G4. Values of the image height IH and the HFOV of the first to the fourth embodiments are also listed in the following tables 9-12. In the following tables, the column labeled "IH" lists absolute values of the image height of sub images, where the value shown in the bottom of the column is the maximum image height in this embodiment. Besides, the column labeled "HFOV" lists values of the half field of view of the optical lens 10 corresponding to their respective image heights, where the value shown in the bottom of the column is the maximum HFOV.

TABLE 9

| IH | HFOV |
|---|---|
| 0 | 0.001 |
| 0.2785 | 15 |
| 0.5714 | 30 |
| 0.7786 | 40 |
| 0.9994 | 50 |
| 1.2383 | 60 |
| 1.4981 | 70 |
| 1.7717 | 80 |
| 2.0448 | 90 |
| 2.1263 | 93 |

TABLE 10

| IH | HFOV |
|---|---|
| 0 | 0 |
| 0.3531 | 14.718 |
| 0.5354 | 22.137 |
| 0.9486 | 38 |
| 1.3 | 50 |
| 1.6435 | 60.736 |
| 1.9725 | 70.583 |
| 2.3053 | 80.351 |
| 2.5696 | 88 |
| 2.675 | 91 |

TABLE 11

| IH | HFOV |
|---|---|
| 0 | 0 |
| 0.3738 | 14.5 |
| 0.5646 | 21.8 |
| 0.9192 | 35 |
| 1.3466 | 50 |
| 1.496 | 55 |
| 1.7102 | 62 |
| 1.9595 | 70 |
| 2.2086 | 78 |
| 2.5899 | 91 |
| 2.694 | 95 |

TABLE 12

| IH | HFOV |
|---|---|
| 0 | 0 |
| 0.2657 | 10 |
| 0.5318 | 20 |
| 0.7989 | 30 |
| 1.0696 | 40 |
| 1.35 | 50 |
| 1.6478 | 60 |
| 1.9668 | 70 |
| 2.3007 | 80 |
| 2.6063 | 89.5 |
| 2.695 | 92.5 |

Figure 8A:
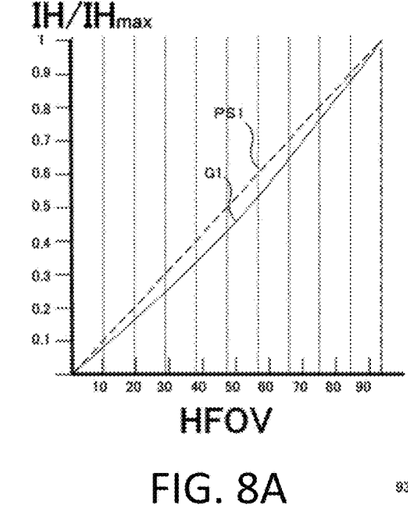
FIGS. 8A, 8B, 8C and 8D show comparison diagrams where a second image of each of the first to fourth embodiments of the invention is compared with a standard image.
Figure 8B:
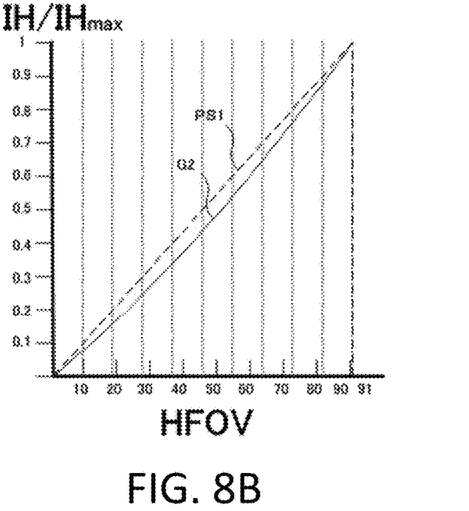
Figure 8C:
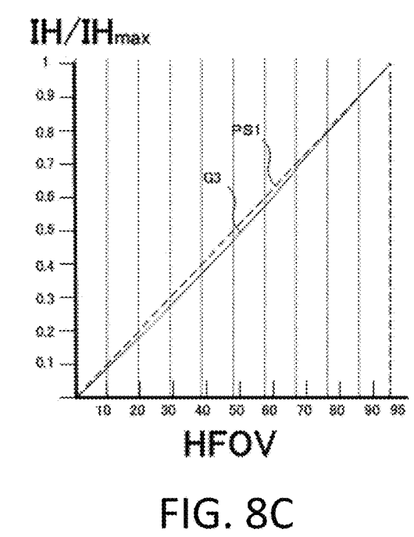
Figure 8D:
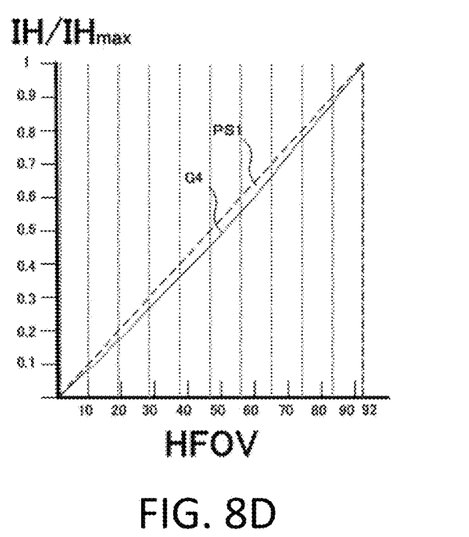

As exemplified in FIG. 8A, the first distribution line G1 represented in a distance ratio/HFOV plot has image heights/distance ratios falling within a range of plus and minus 5% as compared with a standard distribution line PS1. The abscissa is divided, from zero to a maximum HFOV, former to latter, into ten equal parts to divide the distance ratio/HFOV plot into ten sectors (the divisions are indicated by vertical dashed lines shown in FIGS. 8A-8D). In that case, among the former five sectors of the distance ratio/HFOV plot, slopes of a distribution line of at least four sectors of the distance ratio/HFOV plot are smaller than the standard slope, where the at least four sectors are contiguous.

Besides, among the latter five sectors of the distance ratio/HFOV plot, slopes of the distribution line of at least four sectors of the distance ratio/HFOV plot are greater than the standard slope, where the at least four sectors are contiguous. More specifically, the slopes of the first to the tenth sectors of the distribution line according to the first embodiment are respectively smaller, smaller, smaller, smaller, smaller, greater, greater, greater, greater and greater than the standard slope. That is, in this embodiment, a pixel ratio obtained by a field of view corresponding to the former five sectors is smaller than a pixel ratio of the standard image PS; in comparison, a pixel ratio obtained by a field of view corresponding to the latter five sectors is greater than a pixel ratio of the standard image PS.

Figure 9:
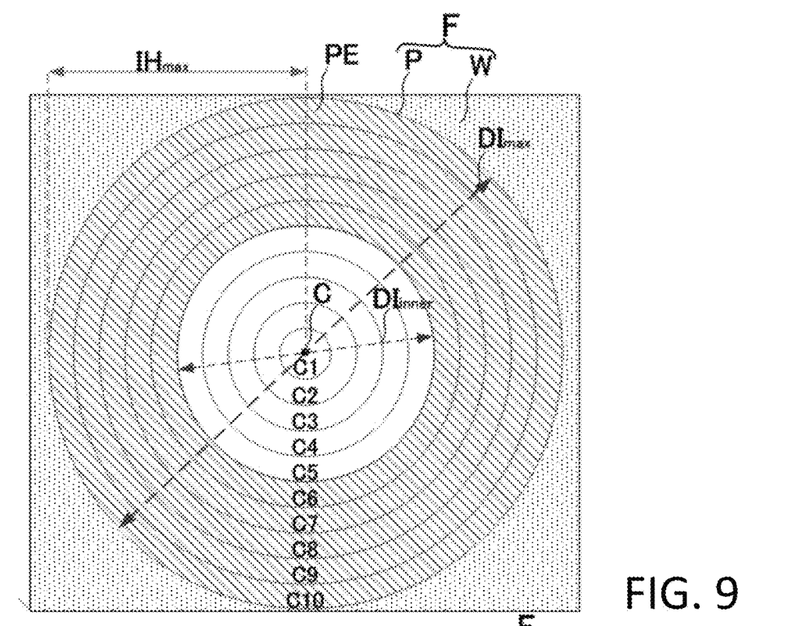
FIG. 9 shows a schematic diagram of a first image according to the third embodiment of the invention.

FIG. 9 shows a schematic diagram of a first image according to the third embodiment of the invention. As shown in FIG. 9, a first image F includes a second image P, and the second image P has a maximum diagonal line with a length $DI_{max}$. In this embodiment, the maximum diagonal length $DI_{max}$ is equal to a length of a straight line connected between two points of the second image P furthest from each other and passing through the reference center C. The second image P has a designated area PE where key scenes allow for a high possibility to appear. In this embodiment, the maximum FOV/HFOV is 190 degrees/95 degrees, and the designated area PE covers an area between a viewing angle greater than 47.5 degrees and a maximum viewing angle; that is, an area between an inner side of the image zone C6 and an outer side of the image zone C10. A length ratio of the designated area PE relative to the maximum diagonal line is equal to the maximum diagonal length $DI_{max}$ minus an inner length DIinner outside the designated area PE and then divided by the maximum diagonal length $DI_{max}$. In this embodiment, the length ratio (a ratio of a diagonal length of the designated area PE to the maximum diagonal length $DI_{max}$) is about 45%, and it follows that the designated area PE may occupy about 70% of an area of the second image P. Note the scope of the designated area PE is not limited to the above exemplified value. It may be satisfactory when the HFOV of the designated area PE reaches 45% or higher of the maximum field of view. However, this percentage is preferably in the range of 50-70%, and more preferably at 55%.

According to the foregoing description, it can be seen the embodiments of the invention may resolve the afore-mentioned problems to achieve the objects of the invention.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the number of lenses for each lens group or optical parameters such as refractive power for each lens may be changed, or a lens without affecting the overall optical performance may be additionally provided. It is intended that the scope of the invention be defined by the claims appended hereto and their equivalents in which all terms are meant in their broadest reasonable sense unless otherwise indicated.

What is claimed is:

1. An optical imaging device, comprising:
   an optical lens comprising, in order from an object side to an image side, a first lens, a second lens and a third lens with refractive powers, the second lens being an aspheric lens, the aspheric lens having a maximum thickness ratio smaller than 4.5 measured in a direction parallel to an optical axis, the optical lens having a maximum field of view greater than or equal to 180 degrees, and the optical lens receiving an image from the object side and outputting a panoramic image to the image side;
   wherein, a ratio of a first length to a second length of the panoramic image is in the range of 30%-50%, the first length is a length of a diagonal line in a 0-100 degrees field of view sector of the panoramic image, and the second length is a length of a diagonal line of a maximum field of view sector of the panoramic image.

2. The optical imaging device as claimed as claim 1, wherein the optical lens satisfies the condition:
   (f2/f)<0, where f2 denotes an effective focal length of the second lens, and f denotes an effective focal length of the optical lens.

3. The optical imaging device as claimed as claim 1, wherein the optical lens comprises a first lens group, a second lens group and an aperture stop disposed between the first lens group and the second lens group, and the first lens group comprises the first lens, the second lens and the third lens.

4. The optical imaging device as claimed as claim 3, wherein the optical lens satisfies the condition:
   0.5<|f2/fL|<5, where f2 denotes an effective focal length of the second lens, fL denotes an effective focal length of a Nth lens, and the Nth lens is a lens with refractive power in the second lens group nearest to the image side.

5. An optical imaging device, comprising:
   an optical lens having a maximum field of view greater than or equal to 180 degrees and forming a panoramic image to an image side;
   wherein a total track length of the optical lens is equal to or smaller than 26.99 mm, the panoramic image is represented as a distribution line in a coordinate plot, an abscissa of the coordinate plot represents a field of view, an ordinate of the coordinate plot represents a distance ratio, the distance ratio is defined as a ratio of a first distance to a second distance, where the first distance is a distance between a point and a center of the panoramic image, the second distance is a distance between an outermost point of the panoramic image and the center of the panoramic image, the abscissa is divided, from zero to a maximum field of view, former to latter, into ten equal parts to correspondingly divide the coordinate plot into ten sectors, slopes of the distribution line of at least four sectors of the latter five sectors of the coordinate plot are respectively greater than a standard slope, and the standard slope is a slope of a straight line connected between coordinates (0, 0) and coordinates (1, 1) of the coordinate plot.

6. The optical imaging device as claimed as claim 5, wherein the at least four sectors having slopes greater than the standard slope are contiguous.

7. The optical imaging device as claimed as claim 5, wherein slopes of the distribution line of at least four sectors of the former five sectors of the coordinate plot are respectively smaller than the standard slope.

8. The optical imaging device as claimed as claim 7, wherein the at least four sectors having slopes smaller than the standard slope are contiguous.

9. The optical imaging device as claimed as claim 5, wherein the slopes of the first to the tenth sectors of the distribution line are respectively smaller, smaller, smaller, smaller, smaller, greater, greater, greater, greater and greater than the standard slope.

10. The optical imaging device as claimed as claim 5, wherein the optical lens comprises at least three aspheric lenses.

11. The optical imaging device as claimed as claim 5, wherein the optical lens comprises, in order from an object side, a first lens, a second lens and a third lens with refractive powers, and the second lens is an aspheric lens.

12. An optical imaging device, comprising:
an optical lens having an aspheric lens, the aspheric lens having a maximum thickness ratio smaller than 4.5 measured in a direction parallel to an optical axis, the optical lens having a maximum field of view greater than or equal to 180 degrees, and the optical lens receiving an image from an object side and outputting a panoramic image to an image side;
wherein a total track length of the optical lens is equal to or smaller than 26.99 mm, a ratio of a first length to a second length of the panoramic image is in the range of 30%-50%, the first length is a length of a diagonal line in a 0-100 degrees field of view sector of the panoramic image, and the second length is a length of a diagonal line of a maximum field of view sector of the panoramic image.

13. The optical imaging device as claimed as claim 12, wherein the optical lens comprises, in order from an object side, a first lens, a second lens and a third lens with refractive powers, and the second lens is the aspheric lens.

14. The optical imaging device as claimed as claim 13, wherein the optical lens satisfies the condition:
(f2/f)<0, where f2 denotes an effective focal length of the second lens, and f denotes an effective focal length of the optical lens.

15. The optical imaging device as claimed as claim 13, wherein the optical lens comprises a first lens group, a second lens group and an aperture stop disposed between the first lens group and the second lens group, the first lens group comprises the first lens, the second lens and the third lens, and the optical lens satisfies the condition:
0.5<|f2/fL|<5, where f2 denotes an effective focal length of the second lens, fL denotes an effective focal length of a Nth lens, and the Nth lens is a lens with refractive power in the second lens group nearest to the image side.

16. An optical imaging device, comprising:
an optical lens comprising at least three aspheric lenses, having a maximum field of view greater than or equal to 180 degrees, and forming a panoramic image to an image side;
wherein the panoramic image is represented as a distribution line in a coordinate plot, an abscissa of the coordinate plot represents a field of view, an ordinate of the coordinate plot represents a distance ratio, the distance ratio is defined as a ratio of a first distance to a second distance, where the first distance is a distance between a point and a center of the panoramic image, the second distance is a distance between an outermost point of the panoramic image and the center of the panoramic image, the abscissa is divided, from zero to a maximum field of view, former to latter, into ten equal parts to correspondingly divide the coordinate plot into ten sectors, slopes of the distribution line of at least four sectors of the latter five sectors of the coordinate plot are respectively greater than a standard slope, and the standard slope is a slope of a straight line connected between coordinates (0, 0) and coordinates (1, 1) of the coordinate plot.

17. The optical imaging device as claimed as claim 16, wherein the at least four sectors having slopes greater than the standard slope are contiguous.

18. The optical imaging device as claimed as claim 16, wherein slopes of the distribution line of at least four sectors of the former five sectors of the coordinate plot are respectively smaller than the standard slope.

19. The optical imaging device as claimed as claim 18, wherein the at least four sectors having slopes smaller than the standard slope are contiguous.

20. The optical imaging device as claimed as claim 16, wherein the slopes of the first to the tenth sectors of the distribution line are respectively smaller, smaller, smaller, smaller, smaller, greater, greater, greater, greater and greater than the standard slope.

* * * * *